(12) United States Patent
Sawant et al.

(10) Patent No.: US 12,014,226 B2
(45) Date of Patent: Jun. 18, 2024

(54) MICROSERVICE PLATFORM MESSAGE MANAGEMENT SYSTEM

(71) Applicant: MASTERCARD INTERNATIONAL INCORPORATED, Purchase, NY (US)

(72) Inventors: Ajinkya Sawant, Saint Charles, MO (US); Gopinatha Joshi, Chesterfield, MO (US); Matthew Ramella, Manchester, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 17/855,676

(22) Filed: Jun. 30, 2022

(65) Prior Publication Data

US 2024/0004739 A1    Jan. 4, 2024

(51) Int. Cl.
*G06F 13/14*    (2006.01)
*G06F 9/54*    (2006.01)

(52) U.S. Cl.
CPC .................... *G06F 9/547* (2013.01)

(58) Field of Classification Search
CPC ...................................... G06F 9/547
See application file for complete search history.

(56) References Cited

U.S. PATENT DOCUMENTS

| | | | |
|---|---|---|---|
| 7,047,536 B1 | 5/2006 | Duncan et al. | |
| 10,462,228 B2 | 10/2019 | Vajravel et al. | |
| 10,528,551 B2 | 1/2020 | Li et al. | |
| 10,880,087 B2 | 12/2020 | Martynov et al. | |
| 11,075,792 B2 | 7/2021 | Deshmukj et al. | |
| 11,115,503 B2 | 9/2021 | Minh et al. | |
| 2018/0075231 A1* | 3/2018 | Subramanian | H04L 63/0807 |
| 2019/0356736 A1 | 11/2019 | Narayanaswamy et al. | |
| 2019/0384633 A1 | 12/2019 | Braverman et al. | |
| 2020/0241944 A1* | 7/2020 | Derdak | G06F 9/547 |

(Continued)

OTHER PUBLICATIONS

Byun, Sung Cheal, "International Search Report & Written Opinion", International Application No. PCT/US2023/019555, dated Jul. 26, 2023, 8 pages.

(Continued)

*Primary Examiner* — Kevin L Young
*Assistant Examiner* — Abdou K Seye
(74) *Attorney, Agent, or Firm* — Barta Jones, PLLC

(57) ABSTRACT

The disclosure herein describes receiving and routing a remote procedure call (RPC) message from an external source. A microservice platform receives an RPC message from a source via an RPC interface, wherein the RPC message includes a header structure and a payload structure. The RPC message is validated based on security data in the header structure and the identity of the source is authenticated based on identity data in the header structure. A service interface function is triggered based on routing data in the payload structure and a multi-layer route and one of a plurality of microservices are identified. Payload data of the payload structure is routed through each of the ordered plurality of layers of the multi-layer route to the identified microservice, wherein each of the ordered plurality of layers and the microservice are configured to perform an operation using the payload data.

20 Claims, 9 Drawing Sheets

(56) References Cited

U.S. PATENT DOCUMENTS

| | | | |
|---|---|---|---|
| 2020/0396225 A1* | 12/2020 | Bhatia | H04L 63/102 |
| 2021/0117249 A1 | 4/2021 | Doshi et al. | |
| 2021/0306429 A1 | 9/2021 | Jonas et al. | |
| 2021/0365499 A1* | 11/2021 | Matiushkin | G06F 9/546 |
| 2022/0342718 A1* | 10/2022 | Iqbal | H04L 67/63 |
| 2023/0409714 A1* | 12/2023 | Chen | G06F 21/566 |

OTHER PUBLICATIONS

Sriraman et al., "μSuite: A Benchmark Suite for Microservices", IEEE International Symposium on Workload Characterization (IISWC), Dec. 13, 2018, retrieved on Jul. 14, 2023, https://ieeexplore.ieee.org/document/8573515, 14 pages.

Rezaei, M., "Migrating APIs from REST to gRPC at WePay", Apr. 8, 2019, 13 pages.

Unknown, "Next Edge Multi Rail-Region Design—Network of the Future Development", downloaded Dec. 13, 2021, 105 pages.

\* cited by examiner

MICROSERVICE PLATFORM MESSAGE MANAGEMENT SYSTEM

BACKGROUND

Many modern computing service platforms provide microservices that are highly maintainable and testable, loosely coupled with respect to each other, and independently deployable. Often, such microservices use computing resources organized around specific business capabilities. A microservice architecture enables a platform to offer a wide variety of computing services to customers, but that variety of offered services also expands the complexity and computing resource costs of providing the microservices to customers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for receiving and routing a remote procedure call (RPC) message from an external source is described. A microservice platform receives an RPC message from a source via an RPC interface, wherein the RPC message includes a header structure and a payload structure. The RPC message is validated based on security data in the header structure and the identity of the source is authenticated based on identity data in the header structure. A service interface function of the microservice platform is triggered based on routing data in the payload structure and, based on the service interface function being triggered, a multi-layer route and one of a plurality of microservices are identified. The multi-layer route includes an ordered plurality of layers. Payload data of the payload structure is routed through each of the ordered plurality of layers to the identified one of the plurality of microservices, wherein each of the ordered plurality of layers and the one of the plurality of microservices are configured to perform an operation using the payload data.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
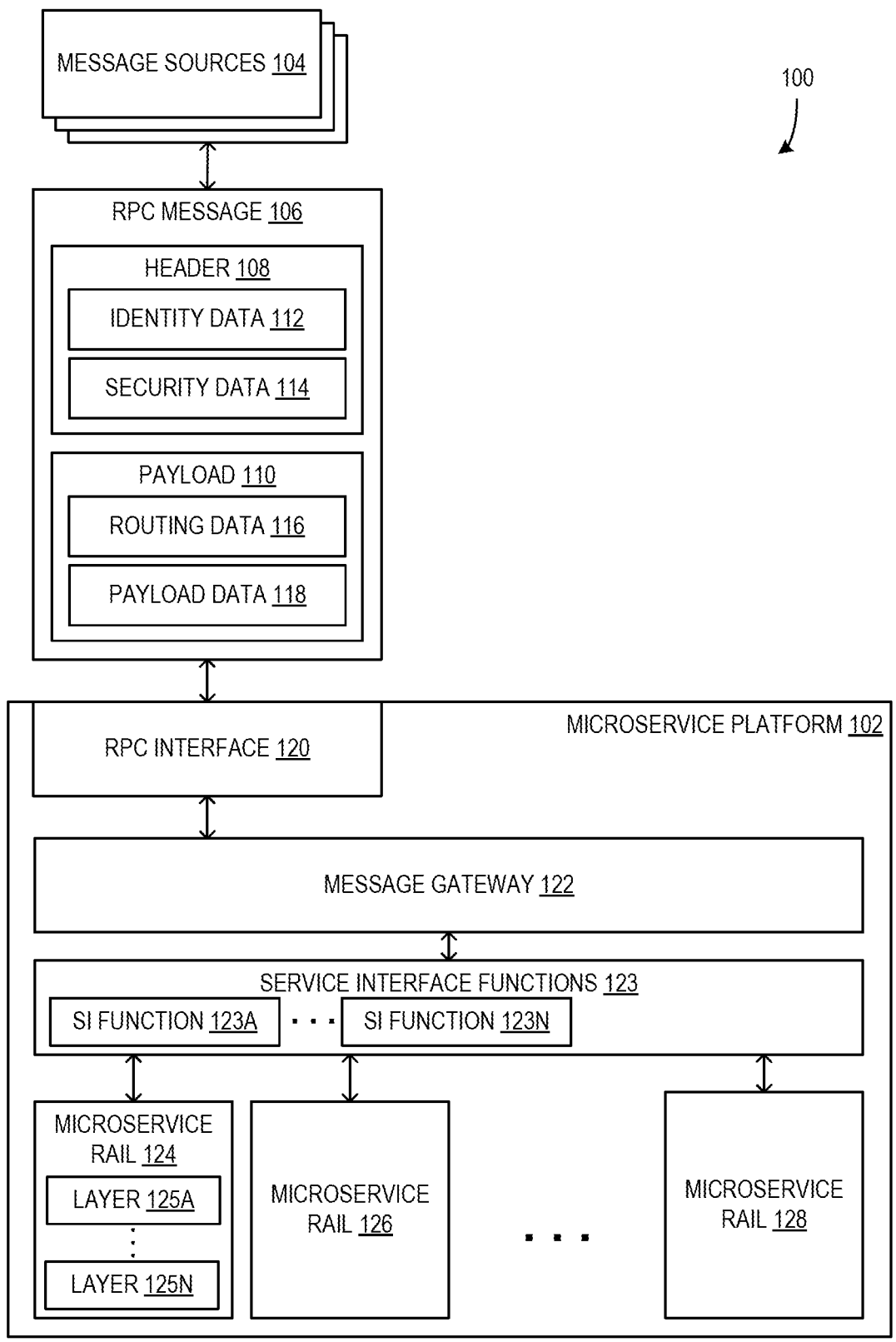
FIG. 1 is a block diagram illustrating a system configured to receive remote procedure call (RPC) messages from external sources and route the received messages to microservice rails.

Aspects of the disclosure provide a computerized method and system for receiving remote procedure call (RPC) messages from external sources and routing data of those messages to microservice rails of a microservice platform. The platform includes an RPC interface configured to receive RPC messages and to perform security operations and/or identity operations based on data stored in the header structures of the messages. Further, the microservice platform identifies a specific microservice for an RPC message based on routing data of the payload structure of the message, and a service interface function associated with the identified microservice is executed on the payload data of the message. The payload data and/or other related data are routed to the microservice rail of the identified microservice from the service interface function. The microservice rail includes layers that perform operations on the data and/or based on the data that are associated with the type of the identified microservice.

The disclosure operates in an unconventional manner at least by enabling external devices (e.g., message sources) to transmit a variety of types of requests and/or other messages to a single computing platform interface in the form of the described RPC messages. These messages and/or associated data are authenticated and/or validated and then routed to microservices of the platform based on metadata of the messages as described herein. The structure of the described RPC messages enables the RPC interface of the computing platform to be flexible in the types of messages it can receive and enhances the security and efficiency of the processing of the RPC messages by the computing platform.

The disclosure includes a multi-rail-region interface that provides edge service interfaces that are lightweight. The interface provides a 'rail and region' dynamic service router for incoming RPC streaming data from message sources, such as devices associated with customers or other entities, via an event gateway. The RPC messages are routed to rails and/or applications with respect to regions using header details passed from the sources in the payload of the message. The disclosure is further configured according to multi-rail strategy principles of supporting account-to-account services, blockchain services, card services, other data services, and external network services.

In some examples, the disclosed RPC message structure includes security tokens that are used by a computing device of the platform to validate RPC messages that are part of a current session between a message source and the described platform. The security of the RPC message interactions is further supported by the use of transport level security techniques and other methods of authenticating the message source and/or validating the message.

The disclosed service interface function provides functions for the message data to reach the respective types of microservices. These interfaces are reached by messages of specific types received via the RPC interface. In some examples, the microservices provided by the described computing platforms are services, applications, or programs that are loosely coupled from other services (e.g., configured with few or no dependencies on other services or applications), they provide specific functionality, and they can be deployed independently from other similar services or applications. In other examples, microservices have more or different features without departing from the description.

FIG. 1 is a block diagram illustrating a system 100 configured to receive RPC messages 106 from external sources 104 and route the received messages 106 to microservice rails 124-128. In some examples, a message source 104 sends an RPC message 106 to the microservice platform 102 via an RPC interface 120 of the platform 102. The message 106 is processed at the message gateway 122 and, based on the processing, the message 106 is routed to one of the microservice rails 124-126 via one of the service interface (SI) functions 123 (e.g., SI functions 123A-123N). Further, in some examples, the microservice platform 102 performs security operations on the RPC message 106 prior to routing the message 106. Additionally, or alternatively, the microservice platform 102 and/or a microservice rail therein are configured to respond to a message source 104 with an RPC message 106 based on operations performed by the microservice.

In some examples, the system 100 includes one or more computing devices (e.g., the computing apparatus 600 of FIG. 6) upon which the components of the system 100 are located and/or executed. For instance, in an example, the system 100 is located and executed on a single computing device. Alternatively, in another example, the components of the system 100 are distributed across multiple computing devices that are in communication with each other via a network (e.g., an intranet, the Internet, or the like). In such an example, the message sources 104 use separate computing devices and send RPC messages 106 to the microservice platform 102 via one or more communication networks. Additionally, or alternatively, the message gateway 122 of the microservice platform 102 is located on a first computing device (e.g., an "edge" device that is exposed to devices outside of a network) and the microservice rails 124-128 are located on other computing devices within the distributed network of computing devices. In other examples, other organizations or arrangements of the components of the system 100 are used without departing from the description.

The message sources 104 include customers, companies, and/or other entities that make use of the services provided by the microservice platform 102. In some examples, the message sources 104 include issuers, acquirers, and/or other parties to electronic payment transactions. For instance, in an example, the microservice platform 102 provides services for processing electronic payments and acquirers and issuers function as message sources 104 by sending RPC messages 106 to request that electronic payments be processed and/or to request that other data operations related to such processing be performed by one or more of the microservice rails 124-128 of the microservice platform 102. In other examples, more, fewer, or different services are provided by the microservice platform 102 without departing from the description.

The RPC messages 106 sent to the RPC interface 120 of the microservice platform 102 include a header 108 structure and a payload 110 structure. In some examples, the header 108 includes identity data 112 used by the microservice platform 102 for identifying the source 104 of the message 106 and security data 114 for performing security operations associated with the message to protect and secure the microservice platform 102 and data stored therein. In such examples, identity data 112 includes a source identifier that identifies the message source 104, identifiers of categories and/or groups with which the source 104 is associated, region or location information associated with the source, or the like. Further, the security data 114 includes tokens or other security information for use in validate the message 106, signature data for authenticating the identity of the source 104, or the like. Additional information with respect to the header 108 of RPC messages 106 is provided below with respect to FIG. 2.

The payload 110 of the RPC message 106 includes routing data 116 and payload data 118. In some examples, the routing data 116 includes information used by the message gateway 122 and/or other component of the microservice platform 102 to route the payload data 118 and/or other data of the RPC message 106 to a particular microservice rail 124-128. Such routing data 116 includes a service identifier that is indicative of the type of service to which the message 106 data should be routed, regional information that is used by the platform 102 to route the message 106 data to region-specific rails, or the like. The payload data 118 varies widely based on the type of service that is being requested with the RPC message 106. For instance, if the service being requested has to do with processing an electronic payment, the payload data 118 includes information about the payer, the payee, the amount being paid, date/time information, or the like. Other types of services require other types of data to be present in the payload data 118 and it is up to the source 104 of the RPC message 106 to populate the payload data 118 in a way can be handled by the target microservice rail 124-128. As with the header 108, the payload 110 is described in greater detail below with respect to FIG. 2.

The RPC interface 120 of the microservice platform 102 includes hardware, firmware, and/or software configured to receive RPC messages 106 from message sources 104 and/or send RPC messages 106 to message sources 104. In some examples, the RPC interface 120 is configured to operate with GOOGLE RPC (GRPC) messages. Additionally, or alternatively, the RPC interface 120 is configured to be compatible with ISO8583 standard data traffic, ISO20022 standard data traffic, and/or other similar standards of data communications.

Further, in some examples, the RPC interface 120 is configured to perform security operations on received RPC messages 106 or otherwise enforce security based on received RPC messages 106. For instance, in an example, the RPC interface 120 is configured to operate using transport layer security (TLS) measures. Additionally, or alternatively, the RPC interface 120 is configured to perform subscription-based security checking of a message 106 based on tokens (e.g., JavaScript Object Notation (JSON) Web Tokens (JWTs)) stored in the security data 114 of the header 108 and/or to perform other identity-based security authentication using security data 114 that is associated with the source 104 of the message 104.

Still further, in some examples, the RPC interface 120 is configured to perform other operations, such as operations that are based on region data of the source 104. In such examples, the RPC interface 120 is configured to identify the source 104 based on a client identifier that is assigned to the source 104, to recognize the RPC client instances of the source 104, and/or to perform source-based operations using a source identifier of the source 104.

Additionally, in some examples, the RPC interface 120 is a single-entry point for all message source traffic. The RPC interface 120 and the microservice platform 102 generally provides granular service-level routing control using the data fields of the payload 110 as described herein. In such examples, the RPC interface 120 lacks business logic associated with the underlying services being offered such that it is a payload agnostic component.

The message gateway 122 includes hardware, firmware, and/or software configured to route RPC messages 106 and/or data therein (e.g., the payload data 118) to various microservice rails 124-128 of the microservice platform 102. In some examples, the message gateway 122 accesses the routing data 116 of the payload 110 data structure and, based on the routing data 116, selects a microservice rail down which to route the payload data 118 and/or other data of the message 106. The selection of a microservice rail is based on the type of service being requested, the format or standard used in the message 106, and/or other features of the message 106. For instance, in some examples, the microservice platform 102 includes different rails 124-128 for ISO8583 messages and for ISO20022 messages. Additionally, or alternatively, the microservice platform 102 includes different microservice rails 124-128 for transaction authorization services, transaction reversal services, transaction processing services, fee collection services, process verification services, key exchange services, network gateway services (MASTERCARD network gateway services (MNGS)), direct access services (MASTERCARD direct service access (DSA)), credit transfer services, blockchain-based services, and/or other types of services. Further, in other examples, other types of rails are included in the platform 102 and selected by the message gateway 122 without departing from the description.

The service interface functions 123 of the platform 102 include hardware, firmware, and/or software configured to interact with specific endpoints of microservice rails 124-128 and/or to perform data processing operations on data of the message 106 to prepare the data for use in a specific microservice rail. In some examples, such processing operations include translating or otherwise transforming data of the message 106 into other forms based on region or service-specific configuration data. Further, in some examples, the service interface functions 123 of the microservice platform 102 include simple switch logic implementations, where the underlying service interface functions or other implementations have custom region selection logic and other steps performed before the message is routed further. The platform 102 is configured to perform such functionality for different service types and to be expanded with more service types by adding a service specific interface implementation. Examples of functionality of service interface functions are described in greater detail below with respect to FIGS. 3A-D.

The microservice rails 124, 126, and 128 of the microservice platform 102 include hardware, firmware, and/or software configured to perform a variety of different operations. In some examples, each rail 124-128 includes a set of subcomponents or layers (e.g., an ordered plurality of layers 125A-125N) that are configured to perform operations based on the data of a routed RPC message 106, where the operations performed by each layer in combination results in the service of the microservice rail being performed. Further, in some examples, some or all microservice rails 124-128 include microservice endpoints that are configured to be the entry points into associated microservice rails 124-128 and decision-making models or logic components that are configured to perform primary functions of the microservice. In some such examples, the remainder of the layers of the rail are automated "pipes" for the data (e.g., the output of a first layer becomes the input to the next layer), such that little or no decision-making is done, and the data is preprocessed in preparation for processing at the logic components or the data is postprocessed in some way after processing at the logic components. In such examples, the layers of a microservice rail are configured to perform data transformation operations, data storage or logging operations, data routing operations, or the like. Such layers include applications or programs located and/or executed on one or more computing devices of the microservice platform 102, such that, in some examples, a microservice rail includes routing data between multiple computing devices of the microservice platform 102. Additionally, or alternatively, some microservice rails include routing data to and/or receiving data from computing devices that are external to the microservice platform 102.

In some examples, the microservice platform 102 includes a region reference data cache and/or a service subscription cache. The region reference data cache is configured to be used for region selection for processing messages associated with electronic transactions. The region selection process is based on account number ranges and/or bank identification number (BIN) ranges. The number ranges and associated region data is obtained and stored in the region reference data cache for region selection during transaction processes (e.g., card switch processes).

The service subscription cache is configured to enable the microservice platform 102 to determine to which services a message source 104 is subscribed. The source identifiers or other identifying information and the associated subscribed service information is cached in the service subscription cache and accessed whenever a message 106 from a source 104 is processed. The microservice 102 is enabled to regulate the subscriptions of sources 104, such that sources 104 that are not subscribed to a particular service are prevented from accessing that service via an RPC message 106.

In some examples, the microservice platform 102 includes audit and billing tracking components. These components are configured to create audit and/or billing events for transactions and to feed those events into a data warehouse or object data store for the auditing and billing of associated events.

Further, in some examples, the microservice platform 102 includes logging and/or monitoring alert functionality. The logging and/or monitoring alerts are triggered when defined types of errors, events, or other behavior are detected. Additionally, or alternatively, thresholds of such behaviors are defined such that, when a sufficient quantity of associated errors or events are detected, an alert is triggered and logged. In some such examples, an associated notification is provided to a system administrator or other user, alerting them of the alert and enabling them to take actions to correct any associated issues.

In some examples, the microservice platform 102 and/or components thereof are configured to integrate with other components and mechanisms to provide access to microservices. In some such examples, a service bridge component is used as a bridge layer between the microservice platform 102, and respective communication mechanisms associated with underlying service instances. Such a layer is configured to translate messages set from components of the microservice platform 102 to an underlying application's native language and/or format as needed.

Further, in some examples, a connectivity status management component is used to enable some message sources 104 (e.g., issuers) to sign in and sign out of sessions that are established with the microservice platform 102. This component is configured to help such sources 104 connect to sessions and maintain those sessions. In some such examples, the connectivity status management component enables the use of session-based tokens in the security data 114 of the RPC messages 106 that are received from the message source 104 during the session as described herein.

Additionally, or alternatively, in some examples, the microservice platform 102 is temporarily unable to reach a target application or endpoint (e.g., a particular server or other entity cannot be reached for processing an electronic transaction). In such examples, an edge decisioning component is used with the platform 102 to act on behalf of the unreached application to process the associated transactions and provide a better experience for the message source 104. The edge decisioning component is configured to perform various processes locally and then to send the processed transactions to the target applications once communication is restored. An example of such an edge decisioning component is described below with respect to the time out decisioning rail 364 of FIG. 3A.

Further, in some examples, a custom region selection and routing component is used with the microservice platform 102 in cases where custom region selection logic is configured to be executed outside of the microservice platform 102. In such cases, transactions or other messages that require such custom region selection logic are routed via the custom region selection and routing component from the microservice platform 102.

Figure 2:
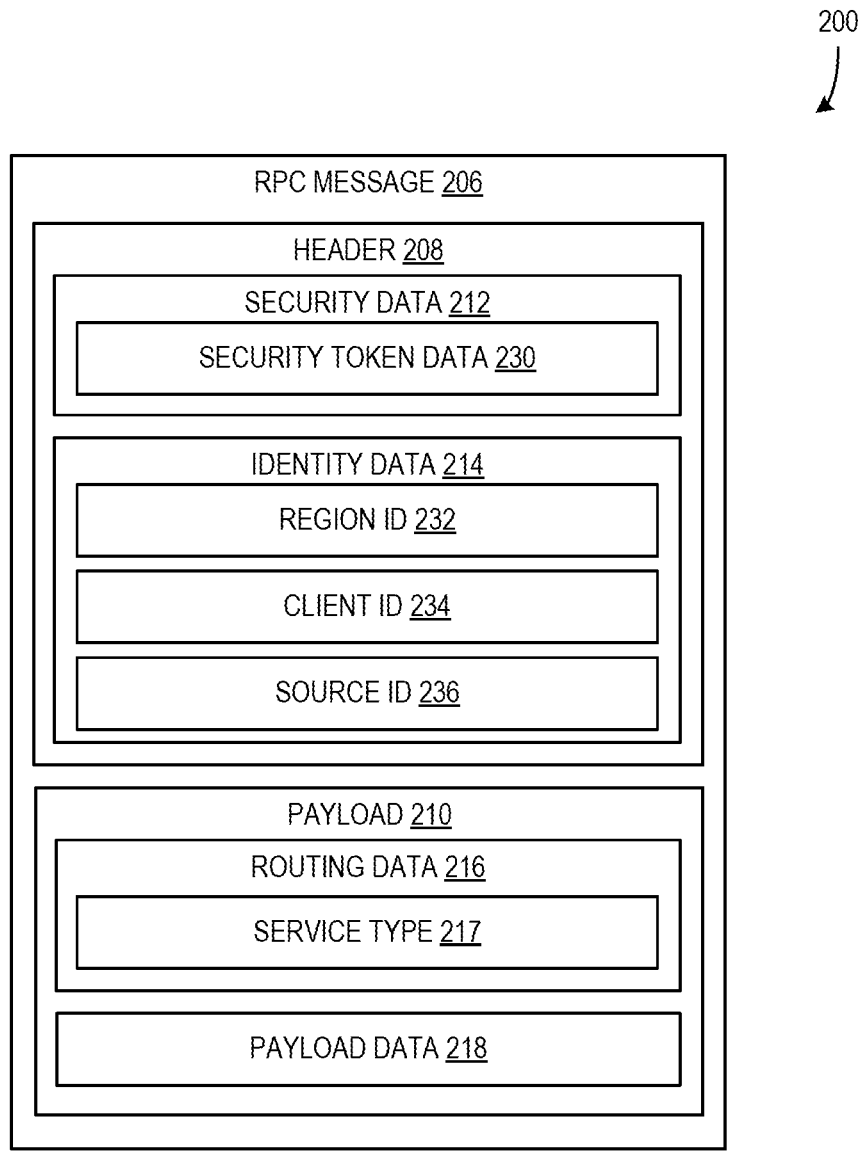
FIG. 2 is a block diagram illustrating an RPC message structure for use with the system of FIG. 1.

FIG. 2 is a block diagram 200 illustrating an RPC message 206 structure for use with the system of FIG. 1. In some examples, the structure of the RPC message 206 is used by the message sources 104 to communicate with the microservice platform 102 of FIG. 1. The RPC message 206 includes a header 208 structure and a payload 210 structure. In some examples, the header 208 and payload 210 include substantially equivalent data and structure to header 108 and payload 110 of FIG. 1, respectively.

The header 208 includes security data 212, which includes security token data 230. In some examples, the security token data 230 includes data of a JWT. The token data 230 includes signature data or the like that has been issued to the message source of the message 206 for use during a current communication session with the microservice platform. This signature data is used by the microservice platform to authenticate the source for each RPC message 206 sent by the source during the session.

To obtain security token data 230 for a session, the source sends an initial RPC message 206 that includes credential data. The microservice platform authenticates the identity of the source based on the credential data and issues security token data 230 to the source for use in future RPC messages 206. In some examples, the security token data 230 is generated using encryption processes that are applied to the credential data and/or other data associated with the source of the RPC message 206 (e.g., as with JWTs). It should be understood that, by using security token data 230 for authentication during sessions, the operation of the microservice platform is made more efficient, as authentication based on the token data 230 is faster and more efficient that repeated authentication of credential data.

The identity data 214 of the RPC message 206 includes a region identity (ID) 232, a client ID 234, and a source ID 236. In other examples, more, fewer, or different types of data are included in the identity data 214. The region ID 232 is indicative of a region in which the source of the RPC message 206 is located. The client ID 234 is an identifier assigned by the message source of the message 206 used recognize all RPC client instances of that source. The source ID 236 is an identity used to uniquely or pseudo-uniquely identify the source of the message 206 itself. In some examples, some or all of these IDs are used during an identity authentication process performed by the microservice platform.

Additionally, or alternatively, the region ID 232 is used to route the RPC message 206 or data therein through the microservice platform to region-specific microservice rail as described herein. In some such examples, the region ID 232 or other region indication or data is included in the routing data 216 of the payload 210.

Further, in some examples, the routing data 216 of the payload 210 includes a service type 217 that is data indicating the type of microservice at which the message 206 is targeted. In some such examples, the service type 217 indicates that the payload data 218 and/or other associated data should be routed to a microservice rail of the service type 217.

In some examples, the RPC message 206 is encapsulated cryptographically to secure the message 206. For instance, in some such examples, the RPC message 206 is encapsulated in a Cryptographic Message Syntax (CMS) object (e.g., an RFC5652 standard-based object) and the payload is signed using a client certificate. A public key in the CMS payload is used to extract the message 206 from the CMS object, which can be done on both sides of the communication. Other types of cryptography are used to secure the RPC message 206 in other examples without departing from the description.

Further, it should be understood that the payload data 218 of the payload 210 is substantially equivalent to the payload data 118 of payload 110 as described above.

FIGS. 3A-D are block diagrams illustrating processing of transaction authorization messages by service interface functions 341A-D of a microservice platform system 100 of FIG. 1. The system 300A of FIG. 3A includes a transaction authorization RPC message 338 sent by an acquirer message source 340 to a service interface function 341A of the system 300A. In some examples, the system 300A is part of or otherwise included in a system such as system 100 of FIG. 1. For instance, the transaction authorization RPC message 338 is provided to the system via an RPC interface 120 of the system and routed to the service interface function 341A through a message gateway 122. In such examples, the service interface function 341A is or is connected to a first layer, or endpoint, of a microservice rail 124-128 and the service interface function 341A is selected by the system based on the RPC message 338 service type being associated with transaction authorization.

In some examples, the transaction authorization RPC message 338 includes service type information indicating that the message includes a transaction authorization request or is otherwise associated with transaction authorization. The message further includes an indication that the message 338 is 'incoming', meaning it is coming from a source external to the system and is targeted at a microservice rail associated with the system. Further, the RPC message 338 includes routing information, region ID, client ID, and/or source ID as described herein. Additionally, or alternatively, the message 338 includes a message ID that identifies the message with respect to the system (e.g., the message ID is assigned to the message by the message gateway of the system).

Upon receiving the transaction authorization RPC message 338, the service interface function 341A looks up the configuration details of the source 340 at 342. The configuration details are obtained from the source config cache 344 that is associated with and/or accessible by the service interface function 341A. The configuration details are used by the service interface function 341A to further guide the processing of the data in the RPC message 338 as described herein.

The message 338 is then translated based on the data within the message 338 and/or based on the source configuration details that were previously obtained at 346. In some examples, the translation process 346 includes looking up the transaction region of the message 338 in the region reference cache, identifying a payment network of the transaction based on data of the message 338 (e.g., a Primary Account Number (PAN) or BIN associated with the transaction), and/or determining an identity of the issuer with which the transaction is associated from the message 338 data.

When the translation is done, the transaction data is cached at 350 in a transaction cache 352. In some examples, the cached transaction data includes region data, acquirer identity data, issuer identity data, message encoding data, routing data, and/or network type data. In other examples, more, fewer, or different types of data are cached without departing from the description.

At 354, the issuer data is queried, including querying the network connectivity of the issuer from the connectivity cache 356. In some examples, the querying includes obtaining the issuer's active region ID and client ID for inclusion with the translated message.

The service interface function 341A then creates an authorization event and an audit event at 358. In some examples, the created authorization event includes data of the message 338 (e.g., data that has been previously translated at 346) and/or data associated with the message that has been previously obtained as described herein. For instance, the authorization event includes card switch type data, region data, message type data, or the like. Further, the created event is formatted according to what is used by the target microservice rail (e.g., an ISO8583-formatted message and/or an ISO20022-formatted message). The created event is provided to an authorization rail 360 that is compatible with the created event.

Additionally, an audit event is created that is stored and can later be used to audit the operation of the system. In some examples, the audit event is sent to an audit rail 362 that is configured to store auditable data of the authorization event in a data store with other audit data.

Further, in some examples, if the issuer targeted by the message 338 is not currently available, the query of the issuer data at 354 times out. In such cases, the cached transaction data in the transaction cache 352 is provided to a time out decisioning rail 364. In such examples, the time out decisioning rail 364 is configured to call a stand-in logic component that performs some authorization operations based at least on the network type of the cached transaction. Additionally, or alternatively, the time out decisioning rail 364 is configured to call an X-code logic component that performs X-code authorization operations based on the network type of the cached transaction. In further examples, on a first time out, the stand-in logic component is used and, on a second time out, the X-code logic component is used.

Figure 3A:
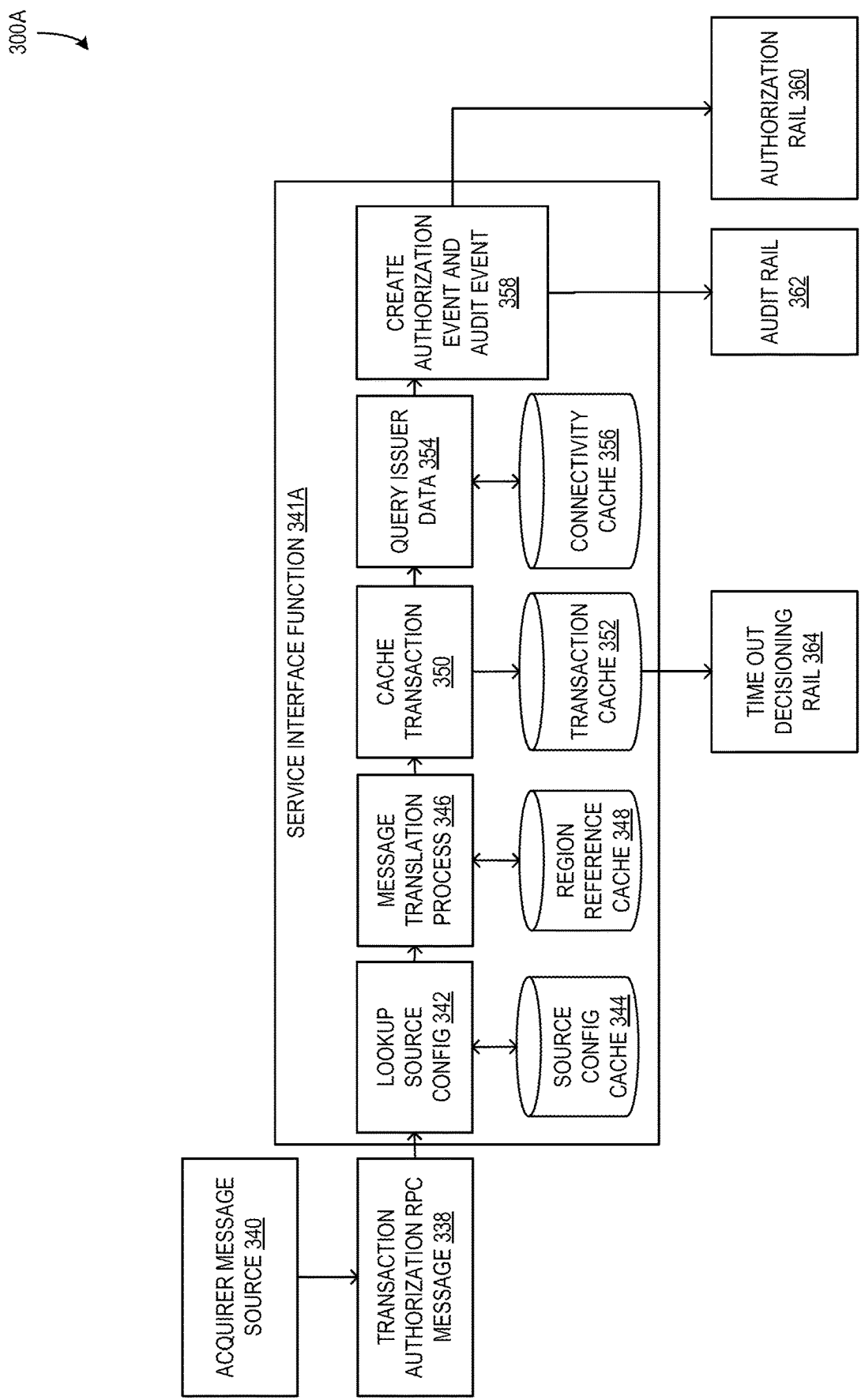
FIGS. 3A-D are block diagrams illustrating processing of transaction authorization messages by service interface functions of a microservice platform system of FIG. 1.
Figure 3B:
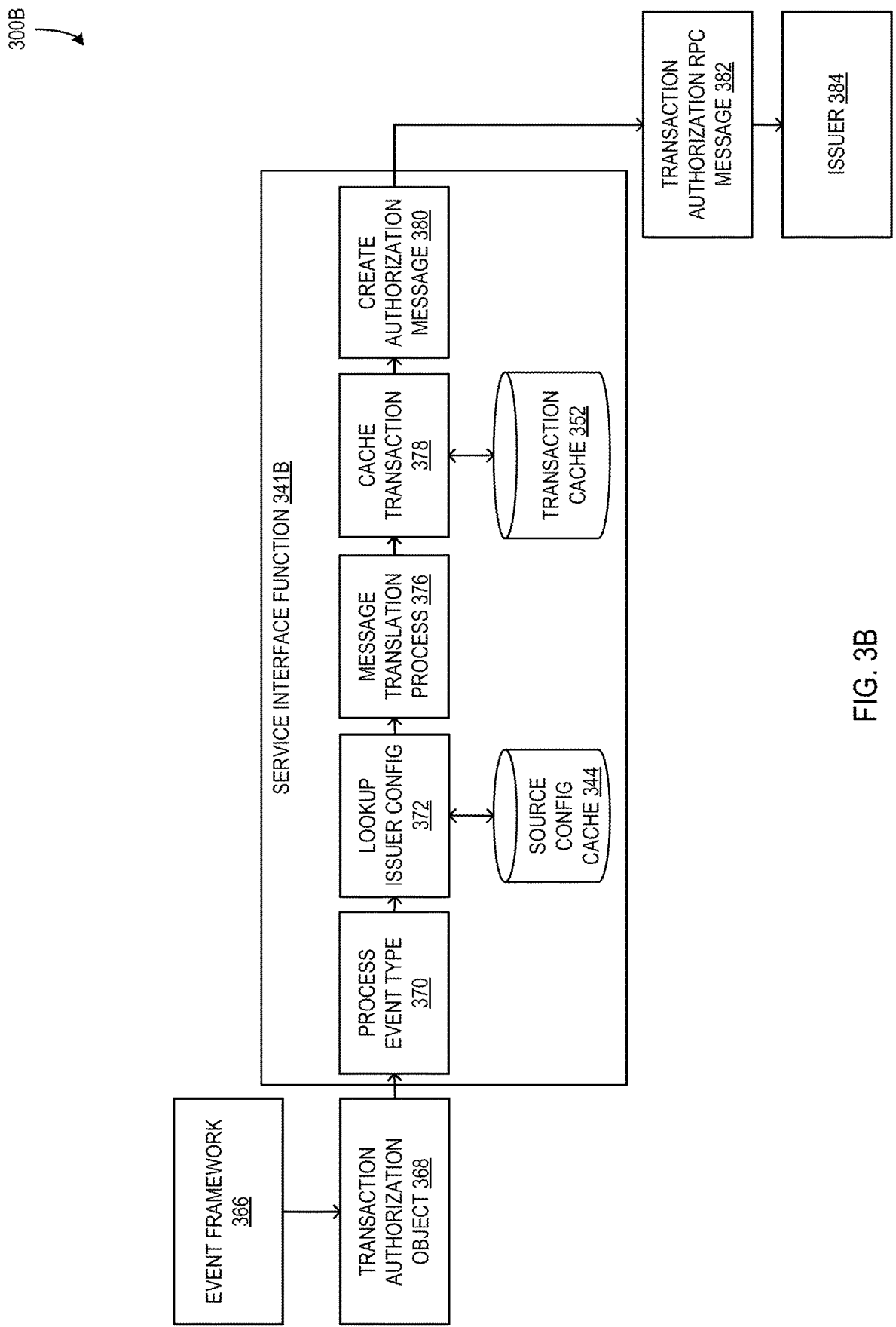

The system 300B of FIG. 3B includes a transaction authorization object 368 sent by the event framework 366 of the system to a service interface function 341B of the system 300B. In some examples, the system 300B is part of or otherwise included in the same system of system 300A and the process of system 300B represents a second leg of a transaction authorization process after the first leg described above with respect to system 300A.

The event framework 366 provides the transaction authorization object 368 to the service interface function 341B and the service interface function 341B processes the object 368 based on the event type of the object at 370. In some examples, the processing of the object includes processing based on a region ID, source ID, or other data in the object 368 without departing from the description. Further, in some examples, the object 368 has been generated by the system 300B based on the authorization event created at 358 in system 300A as described above.

The service interface function 341B is a function that is configured to process or otherwise handle outgoing transaction authorization processes, including processing the event type with which the object is associated at 370. The function 341B then looks up issuer configuration details at 372. In some examples, the configuration details are obtained from the source config cache 344 and the details include a source ID of the issuer identified based on a PAN or BIN, message encoding configuration data associated with the issuer, or the like. At 376, the object is translated into a message based on the data in the object 368 and based on the configuration details obtained at 372. The resulting message is formatted and/or encoded in such a way that it is compatible with the issuer of the authorization process being performed.

At 378, transaction data of the translated message is cached in the transaction cache 352. In some examples, the cached data includes the transaction data payload, the region data, the acquirer client ID and source ID, the issuer identity information and message encoding information, the card switch network type, or the like.

At 380, the translated message is used to create a transaction authorization RPC message 382 (e.g., in the form of an RPC message 106 or 206) that is then sent to the issuer 384. In some examples, the message 382 is populated with the data of the transaction authorization object 368 and data obtained during the processing of the service interface function 341B. For instance, in some such examples, the message 382 includes message type data, routing information that includes a message ID, a client ID of the acquirer, service information associated with the microservice rail being used, header data such as a region ID, client ID, and/or source ID of the issuer, or the like. In other examples, more, fewer, or different types of data are included in the transaction authorization RPC message 382 without departing from the description.

Figure 3C:
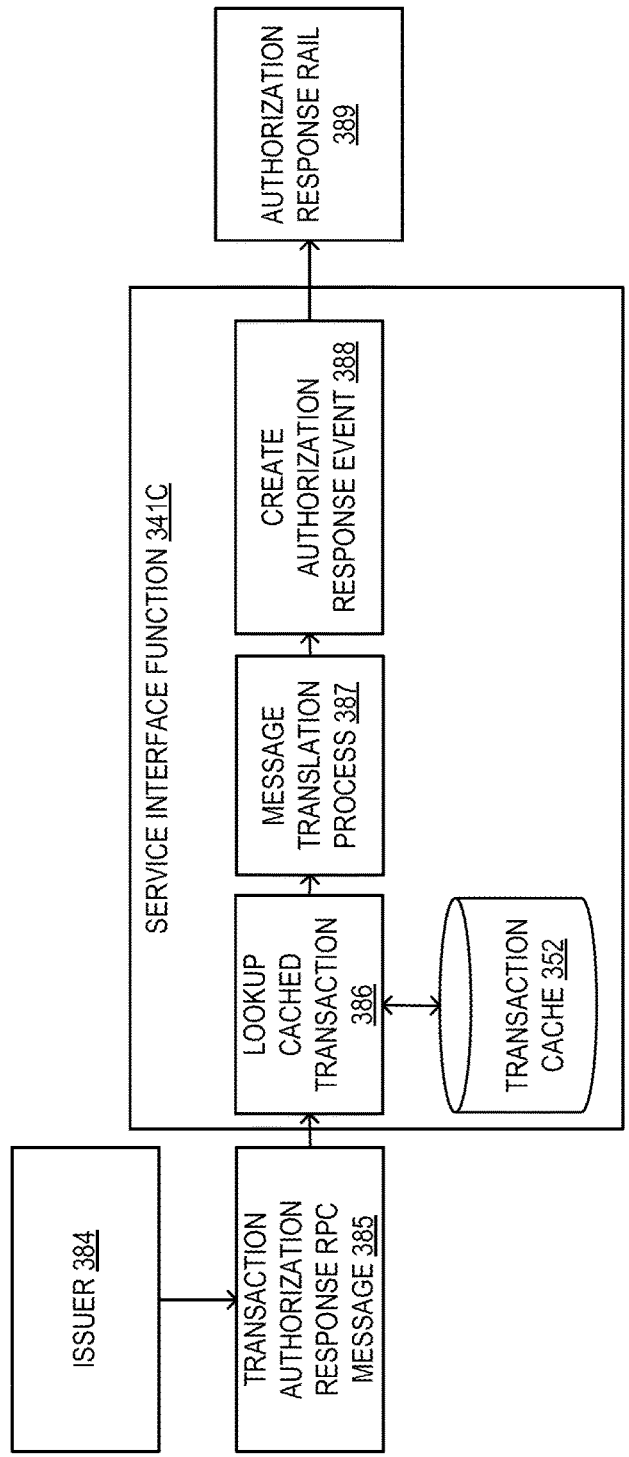

The system 300C of FIG. 3C includes a transaction authorization response RPC message 385 sent by the issuer 384 in response to the transaction authorization RPC message 382 as described above with respect to system 300B. The message 385 is sent to a service interface 341C of the system 300C. In some examples, the system 300C is part of or otherwise included in the same system of systems 300A and 300B and the process of system 300C represents a third leg of a transaction authorization process after the first and second legs described above with respect to systems 300A and 300B.

The service interface function 341C is configured to process and/or otherwise handle issuer response messages to transaction authorization requests such as message 385. Upon receiving the transaction authorization response RPC message 385, the service interface function 341C looks up the cached transaction from the transaction cache 352 at 386. In some examples, the RPC message 385 includes substantially similar data to the RPC message 382, such that the service interface function 341C determines that the message 385 is part of the same authorization process. Further, the RPC message 385 includes type data indicating that the message 385 is an 'authorization response' message, enabling the service interface function 341C to process the message 385 based on that information.

At 387, the service interface function 341C performs a message translation process on the message 385 and the obtained transaction data and, based on the translated message, an authorization response event is created at 388. In some examples, the translation at 387 and event creation at 388 are performed in a substantially similar way to the process described above with respect to 346 and 358 of FIG. 3A. Further, in some examples, an audit event is also created as described above with respect to 358 of FIG. 3A. The created authorization response event is sent to an authorization response rail 389 that is selected based on the type of the created event and/or other information associated with the event, such as region data, source data, or the like.

Figure 3D:
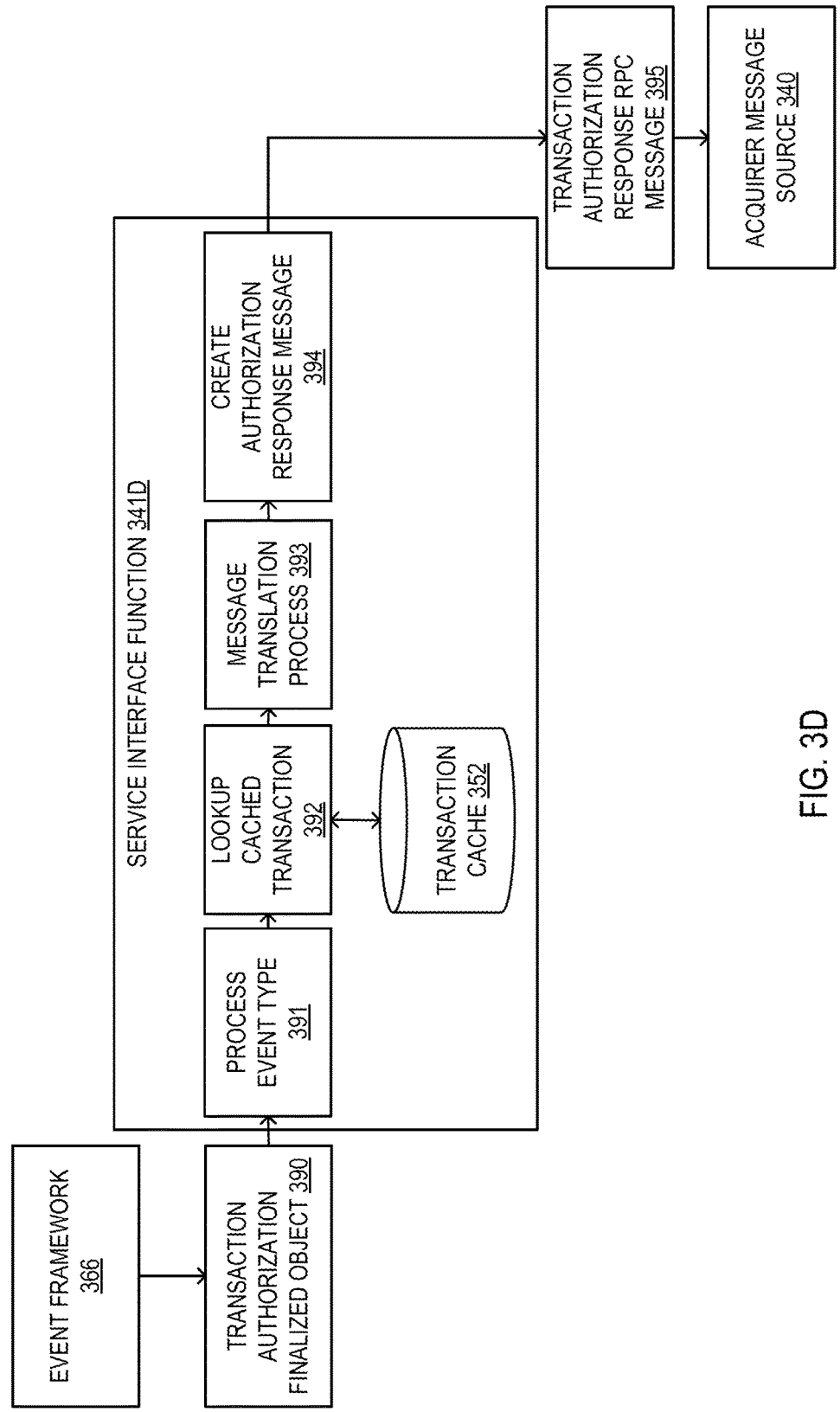

The system 300D of FIG. 3D includes a transaction authorization response object 390 sent by the event framework 366 of the system 300D in response to the authorization response event routed down the authorization response rail 389 as described above with respect to system 300C. The object 390 is sent to a service interface 341D of the system 300D. In some examples, the system 300D is part of or otherwise included in the same system of systems 300A, 300B, and 300C and the process of system 300D represents a final leg of a transaction authorization process after the first, second, and third legs described above with respect to systems 300A, 300B, and 300C.

In some examples, the transaction authorization finalized object 390 includes type data indicating that it is of a 'authorization response finalized' type, such that the service interface function 341D is enabled to process the object 390 based on that information. Further, the object 390 includes region data, client ID data, and source ID data associated with the issuer 384 from which the authorization response came.

At 391, the service interface function 341D processes the object 390 based on the event type data and, at 392, the cached transaction is obtained from the transaction cache 352. In some examples, the processing of the object at 391 and obtaining the cached transaction 392 is performed in substantially the same way as processing the object at 370 of FIG. 3B and obtaining the cached transaction at 386 of FIG. 3C, respectively.

At 393, a message translation process is performed on the object 391 and the obtained transaction data and, at 394, a transaction authorization response RPC message 395 is created. In some examples, the translation process at 393 and the message creation process at 394 are performed in substantially the same way as the processes of 376 and 380 of FIG. 3B, respectively. Further, in some examples, the translation process at 393 includes translating the data of the object 390 and associated transaction data into a format or pattern that is compatible with the acquirer message source 340. In addition, the created message 395 is formatted as an RPC message such as RPC messages 106 and/or 206 as described herein. In some such examples, the message 395 includes type data indicating that the message is of an 'authorization response' type, header data such as region data, client ID data, and source ID data associated with the acquirer 340, routing data such as message ID data, client ID and/or source ID data of the issuer, service information associated with the microservice being used, or the like.

The message 395 is provided to the acquirer message source 340 in response to the initial transaction authorization RPC message 338 sent by the source 340 as described above with respect to FIG. 3A. It should be understood that each of FIGS. 3A-D illustrates one leg of an authorization process that uses the described microservice platform (e.g., microservice platform 102). FIG. 3A illustrates the acquirer 340 communicating with the platform via an RPC message 338; FIG. 3B illustrates the platform communicating with the target issuer of the transaction via and RPC message; FIG. 3C illustrates that same issuer communicating a response to the authorization request with the platform using an RPC message; and FIG. 3D illustrates the platform processing and communicating the response to the acquirer using an RPC message.

Figure 4:
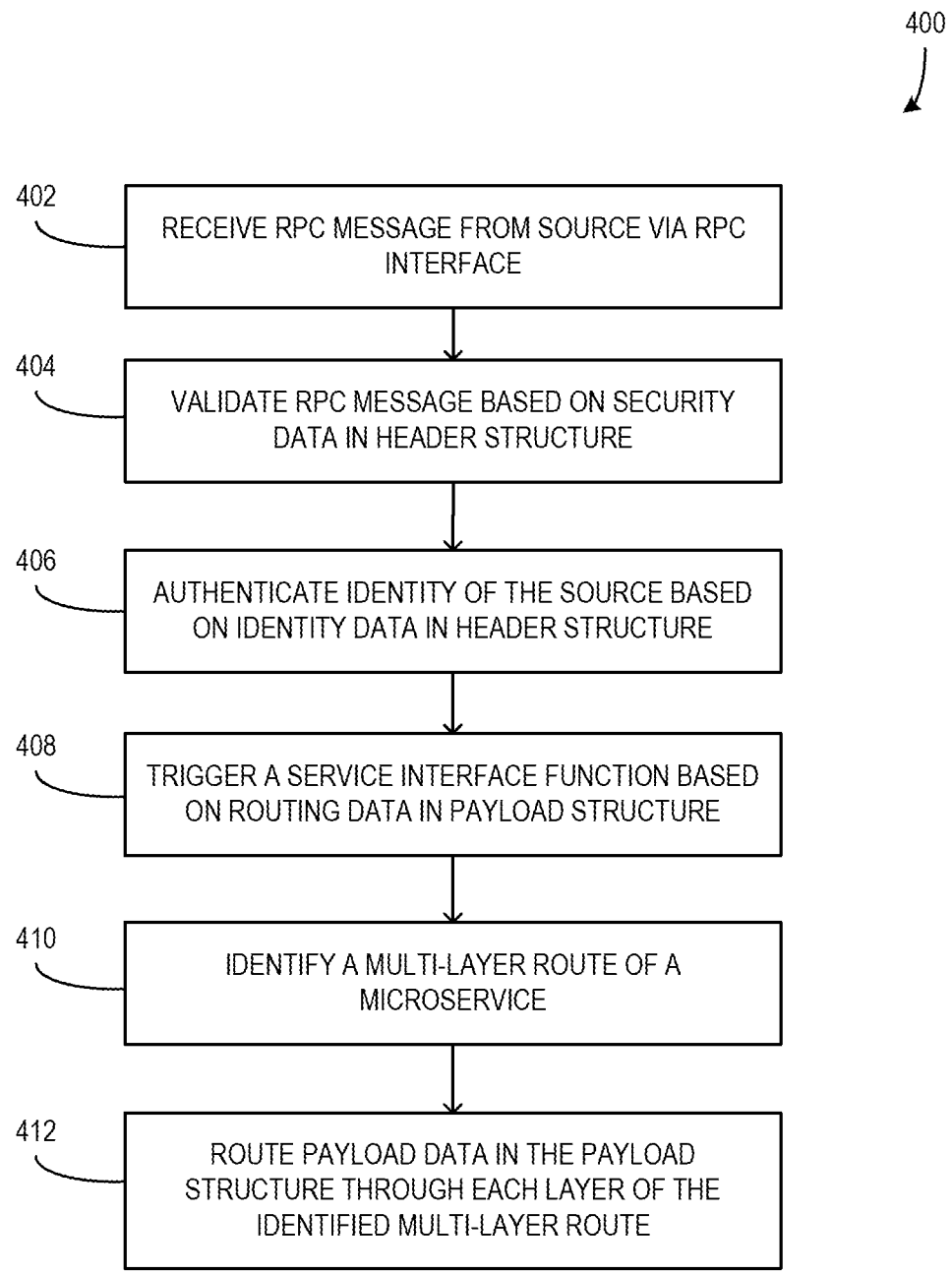
FIG. 4 is a flowchart illustrating a computerized method for routing an RPC message from a source to a microservice of a microservice platform.

FIG. 4 is a flowchart illustrating a computerized method 400 for routing an RPC message (e.g., RPC messages 106 and/or 206) from a source (e.g., message sources 104) to a microservice (e.g., microservice rails 124-128) of a microservice platform (e.g., microservice platform 102). In some examples, the method 400 is executed or otherwise performed by a system such as system 100 of FIG. 1 and/or components thereof.

At 402, an RPC message is received from a source via an RPC interface (e.g., RPC interface 120). In some examples, the received RPC message is formatted as described herein with respect to RPC messages 106 and/or 206. In such examples, the RPC message includes a header structure that includes identity data and security data and a payload structure that includes routing data and payload data.

At 404, the RPC message is validated based on security data (e.g., security data 114) in a header structure (e.g., header 108) of the RPC message. In some examples, the security data includes a session-based token that is validated and the received RPC message is one of a plurality of RPC messages from the source during the session associated with the session-based token. In some such examples, the source initiates a session with an initial RPC message that is validated through other security validation processes and based on successful validation, the source is issued the session-based token by the platform for use with other RPC messages during the session.

At 406, the identity of the source is authenticated based on identity data (e.g., identity data 112) in the header structure. In some examples, the identity data in the header of the message is accessed and that identity data is evaluated. For instance, a source ID code or data value is compared to a cached ID code or data value to determine whether the data from the message matches or otherwise aligns with the cached. Additionally, or alternatively, other identity authentication techniques are used, such as encryption techniques, without departing from the description.

At 408, a service interface function (e.g., SI functions 123A-123N) is triggered, initiated, or otherwise executed based on routing data (e.g., 116) in a payload structure (e.g., payload 110) of the RPC message. In some examples, triggering the service interface function includes using region data, service type data, or the like to translate or otherwise transform data of the message for use by a microservice rail 124-128. In some such examples, other operations performed by the service interface function include caching operations, auditing operations, logging operations, or other operations without departing from the description.

At 410, a multi-layer route (e.g., microservice rails 124-128) of a microservice is identified based on execution of the service interface function. In some examples, the multi-layer route includes an ordered plurality of layers (e.g., layers 125A-N). In such examples, the ordered plurality of layers is configured to route and/or perform operations on payload data and/or other data associated with the RPC message as described herein.

At 412, payload data (e.g., payload data 118) in the payload structure is routed through each layer (e.g., layers 125A-125N) of the identified multi-layer route. Each of the ordered plurality of layers and the associated microservice are configured to perform an operation using the payload data. In some examples, the operation includes analyzing the payload data, transforming the payload data, transforming other data based on the payload data, storing the payload data, or the like.

In some examples, the method 400 further includes generating a response RPC message by the microservice platform based on routing the payload data through each of the ordered plurality of layers of the microservice. The generated response RPC message is sent back to the message source via the RPC interface. In some examples, the response RPC message includes an indicator of a result of the operation performed by the microservice, such as a success indicator or failure indicator.

Additionally, or alternatively, in some examples, in response to routing the payload data through each of the ordered plurality of layers of the microservice, the microservice platform generates an RPC message that is sent to another entity. For instance, the authorization process described above with respect to FIGS. 3A-D includes the generation of RPC messages directed to the issuer entity and the acquirer entity during that process.

In some examples, a microservice is added to the plurality of microservices, such that message sources are enabled to send RPC messages that are targeted to the added microservice, and those RPC messages are routed to the added microservice as described herein. In such examples, the addition of the new microservice includes updating the platform with service interface function associated with the new microservice and an associated microservice rail that are configured to operate as described herein with respect to the new microservice.

Figure 5:
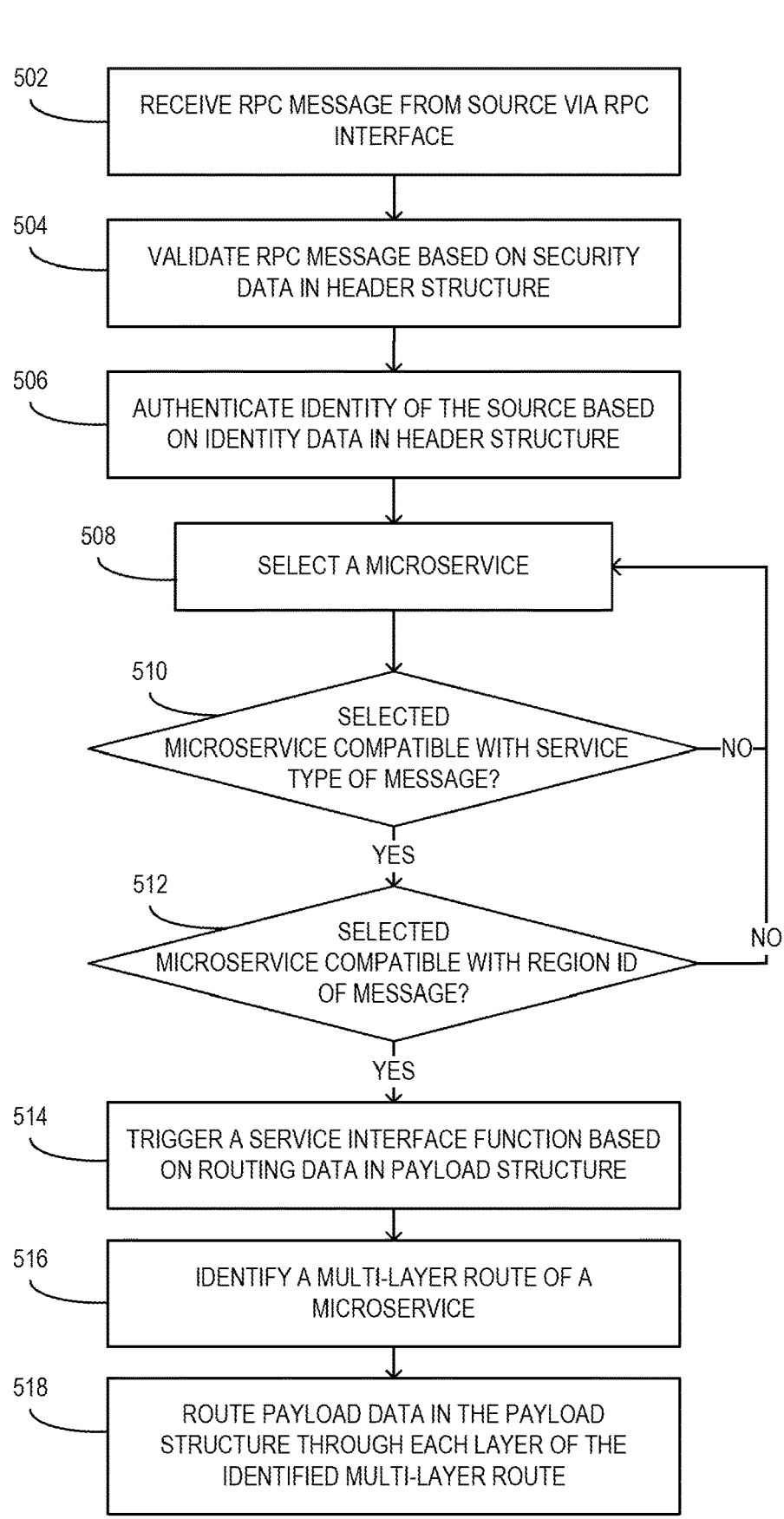
FIG. 5 is a flowchart illustrating a computerized method for routing an RPC message to a selected microservice based on a service type and region identifier of the message.

FIG. 5 is a flowchart illustrating a computerized method 500 for routing an RPC message (e.g., RPC messages 106 and/or 206) to a selected microservice (e.g., microservice rails 124-128) based on a service type and region ID (e.g., region ID 232) of the message. In some examples, the method 500 is executed or otherwise performed by a system such as system 100 of FIG. 1 and/or components thereof.

At 502, an RPC message is received from a source via an RPC interface (e.g., RPC interface 120). At 504, the RPC message is validated based on security data (e.g., security data 114) in a header structure (e.g., header 108) of the RPC message. At 506, the identity of the source is authenticated based on identity data (e.g., identity data 112) in the header structure. In some examples, 502-506 are executed or otherwise performed in substantially the same way as 402-406 as described above with respect to FIG. 4.

At 508, a microservice is selected from a plurality of microservices of the microservice platform.

At 510, if the selected microservice is compatible with a service type of the RPC message, the process proceeds to 512. Alternatively, if the selected microservice is not compatible with the service type of the RPC message, the process returns to 508 to select another microservice.

At 512, if the selected microservice is compatible with the region ID of the message, the process proceeds to 514. Alternatively, if the selected microservice is not compatible with the region ID of the RPC message, the process returns to 508 to select another microservice.

At 514, a service interface function associated with the selected microservice is triggered based on routing data in the payload structure.

At 516, a multi-layer route of the selected microservice is identified and, at 518, the payload data in the payload structure of the RPC message are routed through each layer of the identified multi-layer route. In some examples, 514-518 are executed or otherwise performed in substantially the same manner as 408-412 as described above with respect to FIG. 5.

Exemplary Operating Environment

Figure 6:
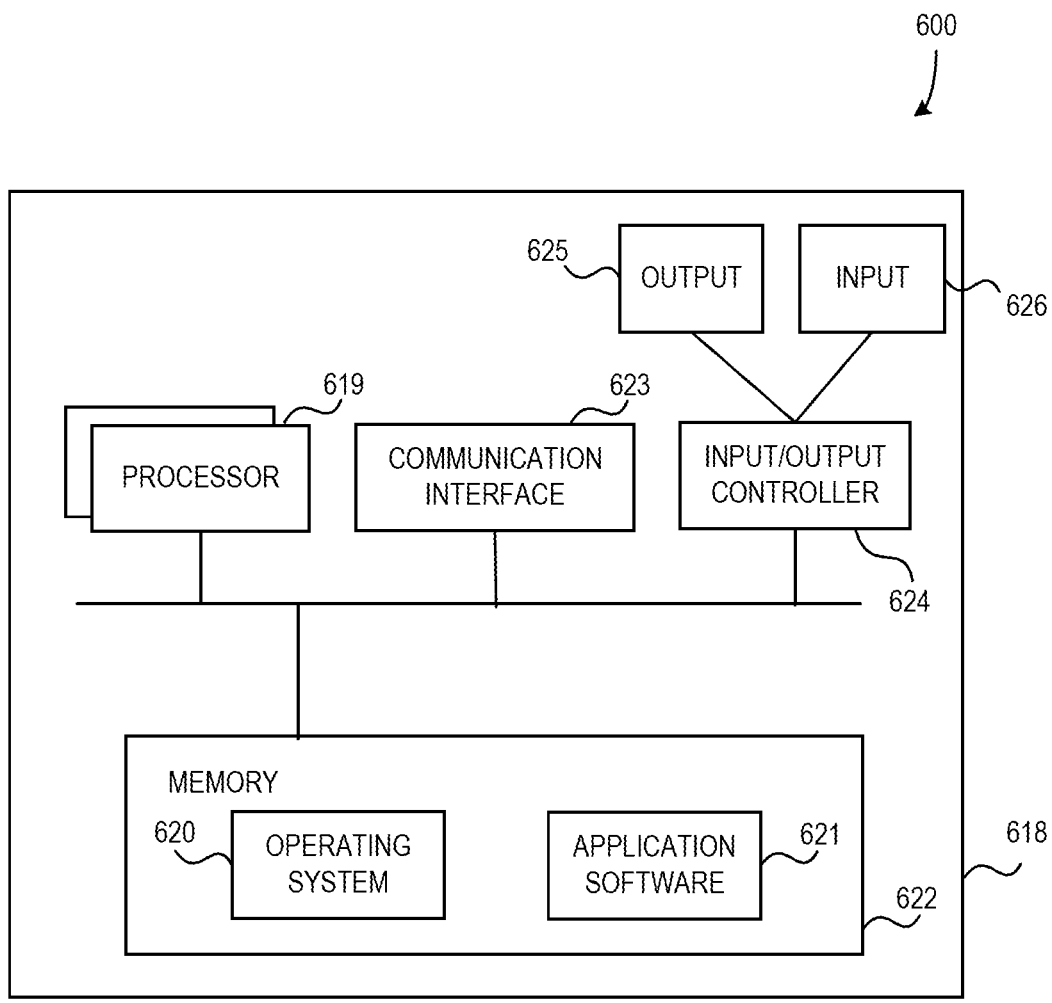
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, receiving and routing RPC messages from external sources to microservice rails of a microservice platform as described herein is accomplished by software, hardware, and/or firmware.

In some examples, computer executable instructions are provided using any computer-readable media that are accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises at least one processor of a microservice platform; and at least one memory comprising computer program code, the at least one memory and the computer program code configured to, with the at least one processor, cause the at least one processor to: receive a remote procedure call (RPC) message from a source via an RPC interface, the RPC message including a header structure and a payload structure; validate the RPC message based on security data in the header structure; authenticate an identity of the source based on identity data in the header structure; trigger a service interface function of the microservice platform based on routing data in the payload structure; based on execution of the service interface function, identify a multi-layer route and one of a plurality of microservices, the multi-layer route including an ordered plurality of layers; and route payload data of the payload structure through each of the ordered plurality of layers to the identified one in the plurality of microservices, wherein each of the ordered plurality of layers and the one of the plurality of microservices are configured to perform an operation using the payload data.

An exemplary computerized method comprises receiving, by a processor of a microservice platform, a remote procedure call (RPC) message from a source via an RPC interface, the RPC message including a header structure and a payload structure; validating, by the processor, the RPC message based on security data in the header structure; authenticating, by the processor, an identity of the source based on identity data in the header structure; triggering, by the processor, a service interface function of the microservice platform based on routing data in the payload structure; based on execution of the service interface function, identifying, by the processor, a multi-layer route and one of a plurality of microservices, the multi-layer route including an ordered plurality of layers; and routing, by the processor, payload data in the payload structure through each of the ordered plurality of layers to the identified one of the plurality of microservices, wherein each of the ordered plurality of layers and the one of the plurality of microservices are configured to perform an operation using the payload data.

One or more computer storage media have computer-executable instructions that, upon execution by a processor of a microservice platform, cause the processor to at least: receive a remote procedure call (RPC) message from a source via an RPC interface, the RPC message including a header structure and a payload structure; validate the RPC message based on security data in the header structure; authenticate an identity of the source based on identity data in the header structure; trigger a service interface function of the microservice platform based on routing data in the payload structure; based on the execution of service interface function, identify a multi-layer route and one of a plurality of microservices, the multi-layer route including an ordered plurality of layers; and route payload data in the payload structure through each of the ordered plurality of layers to the identified one of the plurality of microservices, wherein each of the ordered plurality of layers and the one of the plurality of microservices are configured to perform an operation using the payload data.

Alternatively, or in addition to the other examples described herein, examples include any combination of the following:
- wherein a microservice is added to the plurality of microservices and further comprising updating the microservice platform with a service interface function corresponding to the added microservice.
- wherein the header structure includes region data; and wherein identifying the multi-layer route is further based on the region data.
- further comprising: based on routing payload data in the payload structure through each of the ordered plurality of layers to the identified one of the plurality of microservices, generate a response RPC message; and send the generated response RPC message to the source via the RPC interface.
- wherein validating the RPC message based on security data in the header structure includes validating a session-based token of the security data, wherein the received RPC message is one of a plurality of RPC messages from the source during a session.
- wherein the routing data includes a service type indicator, and the triggered service interface function is associated with a service indicated by the service type indicator.
- wherein the plurality of microservices include at least one of the following: transaction authorization services, transaction reversal services, transaction processing services, fee collection services, process verification services, key exchange services, network gateway services, credit transfer services, and blockchain-based services.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving, by a processor of a microservice platform, a remote procedure call (RPC) message from a source via an RPC interface, the RPC message including a header structure and a payload structure; an exemplary means for validating, by the processor, the RPC message based on security data in the header structure; an exemplary means for authenticating, by the processor, an identity of the source based on identity data in the header structure; an exemplary means for triggering, by the processor, a service interface function of the microservice platform based on routing data in the payload structure; based on execution of the service interface function, an exemplary means for identifying, by the processor, a multi-layer route and one of a plurality of microservices, the multi-layer route including an ordered plurality of layers; and an exemplary means for routing, by the processor, payload data in the payload structure through each of the ordered plurality of layers to the identified one of the plurality of microservices, wherein each of the ordered plurality of layers and the one of the plurality of microservices are configured to perform an operation using the payload data.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor of a microservice computing platform; and
   at least one memory comprising computer program code, the at least one memory and the computer program code configured to, with the at least one processor, cause the at least one processor to:
   receive a remote procedure call (RPC) message from an external source via an RPC interface, the RPC message including a header structure and a payload structure, the RPC message being associated with a requested service;
   validate the RPC message based on security data in the header structure;
   authenticate an identity of the external source based on identity data in the header structure;
   trigger a service interface function of the microservice computing platform based on routing data in the payload structure;
   based on execution of the service interface function, identify one of a plurality of microservices, the identified microservice including an associated microservice rail, the microservice rail including an ordered plurality of layers and an end point configured as a logic component; and
   route payload data of the payload structure through each of the ordered plurality of layers to the end point, wherein a first subset of the ordered plurality of layers is configured to perform operations using the payload data, and a second subset of the ordered plurality of layers is configured to preprocess output of the first subset and provide the preprocessed output to the end point for final processing, wherein at least the performed operations and the final processing represent execution of the service requested in the RPC message.

2. The system of claim 1, wherein upon receiving a request from an outside component for accessing a microservice, the at least one memory and the computer program code are configured to, with the at least one processor, further cause the at least one processor to provide a bridge component between the outside component and the microservice that translates messages from the microservice into a native language of an underlying application associated with the outside component.

3. The system of claim 1, wherein each layer of the ordered plurality of layers includes an application executed on a computing device of the microservice computing platform to perform the operation using the payload data.

4. The system of claim 1, wherein the at least one memory and the computer program code are configured to, with the at least one processor, further cause the at least one processor to:
   based at least on the performed operations and the final processing, generate a response RPC message; and
   send the generated response RPC message to the external source via the RPC interface.

5. The system of claim 1, wherein validating the RPC message based on security data in the header structure includes validating a session-based token of the security data, wherein the received RPC message is one of a plurality of RPC messages from the external source during a session.

6. The system of claim 4, wherein the requested service in the RPC message is a transaction processing service, and sending the generated response RPC message to the external source via the RPC interface comprises sending a success or failure indication of the transaction processing service.

7. The system of claim 1, wherein the plurality of microservices include at least one of the following: transaction authorization services, transaction reversal services, transaction processing services, fee collection services, process verification services, key exchange services, network gateway services, credit transfer services, and blockchain-based services.

8. A computerized method comprising:
   receiving, by a processor of a microservice platform, a remote procedure call (RPC) message from an external source via an RPC interface, the RPC message including a header structure and a payload structure, the RPC message being associated with a requested service;
   validating, by the processor, the RPC message based on security data in the header structure;
   authenticating, by the processor, an identity of the external source based on identity data in the header structure;
   triggering, by the processor, a service interface function of the microservice platform based on routing data in the payload structure;
   based on execution of the service interface function, identifying, by the processor, a one of a plurality of microservices, the identified microservice including an associated microservice rail, the microservice rail including an ordered plurality of layers and an end point configured as a logic component; and
   routing, by the processor, payload data in the payload structure through each of the ordered plurality of layers to the end point, wherein a first subset of the ordered plurality of layers is configured to perform an operations using the payload data, and a second subset of the ordered plurality of layers is configured to preprocess output of the first subset and provide the preprocessed output to the end point for final processing, wherein at least the performed operations and the final processing represent execution of the service requested in the RPC message.

9. The computerized method of claim 8, wherein a microservice is added to the plurality of microservices and further comprising updating the microservice platform with a service interface function corresponding to the added microservice.

10. The computerized method of claim 8, further comprising:
    receiving a request from an outside component for accessing a microservice; and
    providing a bridge component between the outside component and the microservice that translates messages from the microservice into a native language of an underlying application associated with the outside component.

11. The computerized method of claim 8, further comprising:
    based at least on the performed operations and the final processing generating a response RPC message; and
    fiend sending the generated response RPC message to the external source via the RPC.

12. The computerized method of claim 8, wherein validating the RPC message based on security data in the header structure includes validating a session-based token of the security data, wherein the received RPC message is one of a plurality of RPC messages from the external source during a session.

13. The computerized method of claim 8, wherein the routing data includes a service type indicator, and the triggered service interface function is associated with a service indicated by the service type indicator.

14. The computerized method of claim 8, wherein the plurality of microservices include at least one of the following: transaction authorization services, transaction reversal services, transaction processing services, fee collection services, process verification services, key exchange services, network gateway services, credit transfer services, and blockchain-based services.

15. One or more computer storage media having computer-executable instructions that, upon execution by a processor of a microservice platform, cause the processor to at least:
 receive a remote procedure call (RPC) message from an external source via an RPC interface, the RPC message including a header structure and a payload structure, the RPC message being associated with a requested service;
 validate the RPC message based on security data in the header structure;
 authenticate an identity of the external source based on identity data in the header structure;
 trigger a service interface function of the microservice platform based on routing data in the payload structure;
 based on execution of the service interface function, identify one of a plurality of microservices, the identified microservice including an associated microservice rail, the microservice rail including an ordered plurality of layers and an end point configured as a logic component; and
 route payload data in the payload structure through each of the ordered plurality of layers to the end point, wherein a first subset of the ordered plurality of layers is configured to perform operations using the payload data, and a second subset of the ordered plurality of layers is configured to preprocess output of the first subset and provide the preprocessed output to the end point for final processing, wherein at least the performed operations and the final processing represent execution of the service requested in the RPC message.

16. The one or more computer storage media of claim 15, wherein a microservice is added to the plurality of microservices and wherein the computer-executable instructions, upon execution by the processor, further cause the processor to at least update the microservice platform with a service interface function corresponding to the added microservice.

17. The one or more computer storage media of claim 15, wherein the computer-executable instructions, upon execution by the processor, further cause the processor to at least:
 receive a request from an outside component for accessing a microservice; and
 provide a bridge component between the outside component and the microservice that translates messages from the microservice into a native language of underlying application associated with the outside component.

18. The one or more computer storage media of claim 15, wherein the computer-executable instructions, upon execution by the processor, further cause the processor to at least:
 based at least on the performed operations and the final processing, generate a response RPC message; and
 send the generated response RPC message to the external source via the RPC interface.

19. The one or more computer storage media of claim 15, wherein validating the RPC message based on security data in the header structure includes validating a session-based token of the security data, wherein the received RPC message is one of a plurality of RPC messages from the external source during a session.

20. The one or more computer storage media of claim 15, wherein the routing data includes a service type indicator, and the triggered service interface function is associated with a service indicated by the service type indicator.

* * * * *